G. W. HEINKEL.
SPINDLE HEAD.
APPLICATION FILED FEB. 3, 1917.
1,326,863.
Patented Dec. 30, 1919.
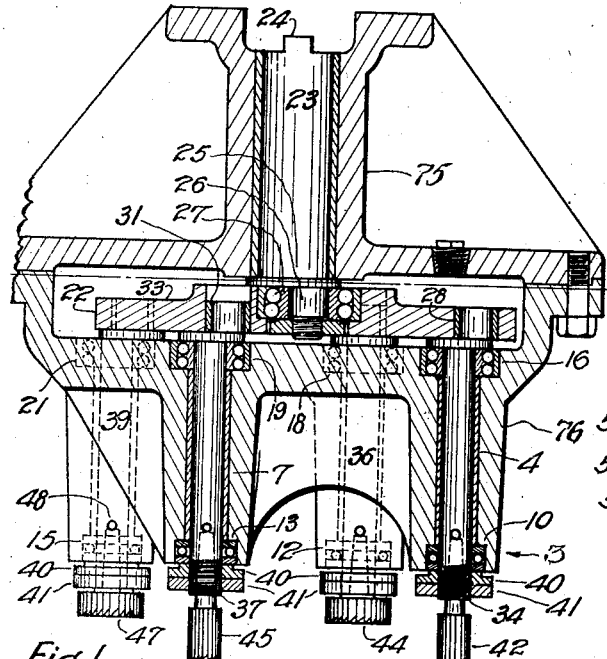
Fig. I.
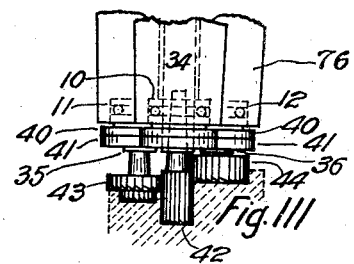
Fig. III
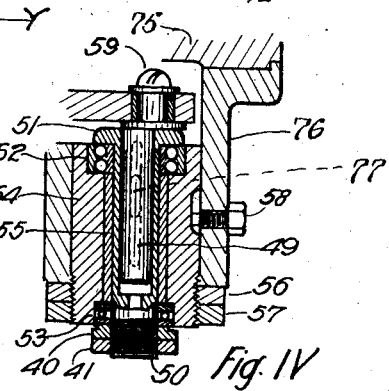
Fig. IV
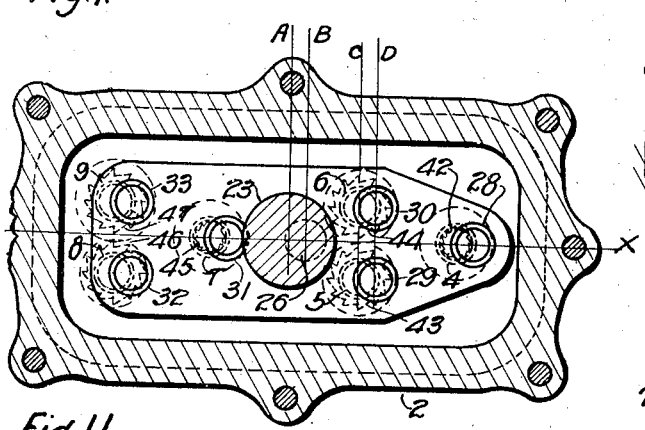
Fig. II
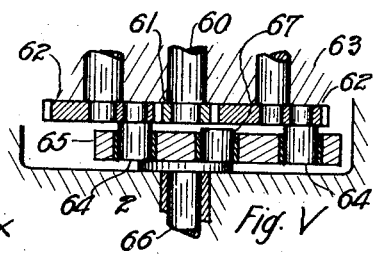
Fig. V
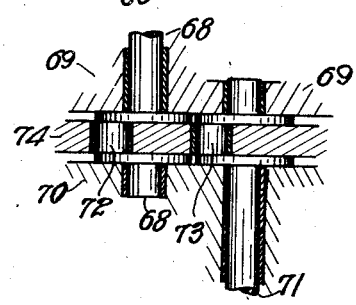
Fig. VI
Witnesses:
Henry P. Sydow.
Frank D. Welker
Inventor:
George W. Heinkel
C. J. Heinkel Atty.

UNITED STATES PATENT OFFICE.

GEORGE W. HEINKEL, OF SANDUSKY, OHIO.

SPINDLE-HEAD.

1,326,863.    Specification of Letters Patent.    Patented Dec. 30, 1919.

Application filed February 3, 1917. Serial No. 146,318.

*To all whom it may concern:*

Be it known that I, GEORGE W. HEINKEL, a citizen of the United States, residing at Sandusky, county of Erie, and State of Ohio, have invented a new and useful Spindle-Head, of which the following is a specification.

My invention relates to spindle-heads in which a plurality of spindles are mounted and which spindles are driven by a crank motion.

The object of the present invention is a simple and efficient mechanism whereby one or more tools or spindles can operate at the same time or simultaneously and wherein the usual " gear marks " are eliminated.

One embodiment of the present invention, together with some modifications are shown in the accompanying drawings in which: Figure I is a section of a head taken on line 1 of Fig. II; Fig. II is a section on line 2 of Fig. I; Fig. III is a partial end view of Fig. I at 3; Fig. IV is a sectional view of a cutter spindle provided with longitudinal adjustment; Fig. V is a sectional view showing change-speed gears on the driving spindle; and Fig. VI is a sectional view showing a method of supporting the spindles on both sides of the cranks.

Similar reference characters refer to similar parts throughout the several views.

Referring particulaly to Figs. I, II, and III—

One end of the housing 75 is adapted to fit to whatever machine the present apparatus is to be used on while the other end thereof is adapted to receive and centralize the housing cover 76. A bore and bushing, suitably located, is provided in this housing to receive the driving-spindle 23.

The housing-cover 76 has suitable bores to receive the bushings 4, 5, 6, 7, 8, and 9, also the thrust-bearings 10, 11, 12, 13, and 15, and also the annular bearings 16, 18, 19, and 21; to avoid complications in the drawing, one of the thrust bearings adjacent to the bushing 8, as well as two annular bearings adjacent to the bushings 5 and 8, are not shown on the drawing, but the manner of mounting the same is similar to the bearings 10, 11, 12, 13, 15, 16, 18, 19, and 21 and is thought obvious. All of the aforesaid bores being spaced and located to suit the work to be operated upon by the apparatus. This housing-cover is designed to provide sufficient material around the spindles for strength and ribbed for stiffness while sufficient clearance is provided inside thereof to permit the driving-plate 22 to rotate therein. In order to have all or at least a portion of each moving member within the housing in contact with oil or grease at all times, it is preferred that the housing 75 and housing-cover 76 be made oil-tight and arranged so that the interior thereof can be filled, wholly or partly, with oil or grease.

The driving-spindle 23 is rotatably mounted in the bushing in the housing 75, has the driving end 24 which is adapted to engage the driving mechanism of the machine to which the apparatus is attached, and has the end 25 with the crank-pin 26 which fits into the annular bearing 27 as shown.

The driving-plate 22 has a central bore into which the bearing 27 fits and further has six bores into which the bushings 28, 29, 30, 31, 32, and 33 fit; these last mentioned bores must be spaced the same as the bores into which the bushings 4, 5, 6, 7, 8, and 9 fit, but must be off center one half of the complete throw of the crank 25; or, in other words, the distance between the center-lines A and B must be equal to the distance between the center-lines C and D.

The body portion of the cutter-spindles 34, 36, 37, and 39 fit rotatably into the bushings 4, 5, 6, 7, 8, and 9 and to the bearings 10, 11, 12, 13, 14, 15, 16, 17, 18, 19, 20, and 21 respectively as shown; to avoid complications in the drawing, two of the spindles located in the bushings 5 and 8 are not shown in the drawing, but the manner of mounting the same is similar to the mounting of the spindles 34, 36, 37, and 39 and is thought obvious. The upper end of each cutter-spindle is provided with a crank-pin which fit into the bushings 28, 29, 30, 31, 32, and 33 respectively; the throw of each of these cranks being equal to the throw of the crank 25 on the driving-spindle 23. The lower end of each of these cutter-spindles, is threaded to receive the adjusting-nuts 40 and the lock-nuts 41. This lower end is further provided with suitable openings to receive the shanks of the milling-cutters 42, 43, 44, 45, 46, and 47. The opening 48 is provided to facilitate the removal of the cutters.

The structure selected to illustrate the present invention shows a spindle-head arranged for a milling operation to mill the surfaces of a piece of work formed as shown sectionally dotted in Fig. III; the cutters 42, 43, and 44 being roughing-cutters while the cutters 45, 46, and 47 are finishing-cutters.

The ball-bearings shown may be replaced by plain bearings, but it is preferred that the thrust-bearings 10, 11, 12, 13, 14, and 15 be provided since a plain collar at those places would wear quickly and cause binding and thrust against the driving-plate 22 which condition would impair the operation and efficiency of the apparatus. It is desirable that the driving-plate 22 float freely in the housing at all times. The general arrangement of the several elements, together with these thrust-bearings, is such that the end-thrust of the spindles is transmitted to the housing and does not impair the free working of the moving parts.

The operation of the mechanism shown is as follows: When the driving-spindle 23 is rotated, the crank-pin 26 travels in a circular path and since the crank-pin 26 engages the driving-plate 22 the latter must follow the same path; while doing so, the crank-pins on the cutter-spindles, which are also engaging the driving-plate 22 must follow the driving-plate 22 and, in doing so, rotate the driving-spindles whereby the milling-cutters are rotated.

In order to further increase the efficiency of the apparatus, it is preferred that each cutter-spindle be made adjustable. In the apparatus illustrated for instance, where the steps on the surfaces of the work which is being machined must be accurate, the cutters should be adjustable, since it would require considerable time and labor to grind the different cutter-faces to the proper dimensions. Or, another instance, when this invention is applied to a multiple drill-head. In such an instance, it is generally desirable and economical to have the points of the drills even so that they all come through the work at the same time. If one or more of the drills were shorter than the others, the apparatus would have to feed longer which means loss of time; the points of the longer drills will start to cut before the shorter ones and the apparatus will have to feed long enough to cause the shorter drills to pass through the work; the longer drills being idle for a certain length of time. It frequently happens that one or more of the drills break off, or one or more of the drills wear off quicker than the others; in either case it would either be necessary to grind the longer drills down to the length of the shorter ones or to let the apparatus feed long enough to permit the shortest drill to go through the work. Neither of these features is economical. To ocercome these disadvantages, it is preferred that the cutter-spindles be made adjustable; one such arrangement being illustrated in Fig. IV, in which the driving-spindle 49 is mounted in the sleeve 50 with a feather or spline 77. The sleeve 50 has the collar 51 against which the annular bearing 52 rests. On the other end, the sleeve 50 is threaded to receive the adjusting-nut 40 and the lock-nut 41 and also has an opening to receive a tool-shank. In proper position on this sleeve 50 the thrust-bearing 53 is mounted. Both ball-bearings being mounted in the casing 54 which also has the bushing 55. This casing 54 is threaded on one end to receive the adjusting-nut 56 and lock-nut 57 and, approximately midway of its length, is provided with a key-way to receive the point of the lock-screw 58. This casing 54 fits slidingly into the bore of the housing cover 76 which is, in this instance, provided with a tapped hole to receive the lock-screw 58. In this arrangement, it is desirable that the screw and washer 59 be provided to hold the driving-spindle 49 in position with relation to the driving-plate 22.

In this arrangement, it will be seen that the cutter-spindle 49 engages the sleeve 50 which carries the cutting-tool.

In order to adjust this mechanism, it is only necessary to rotate the adjusting-nut 56 until the end of the cutter is in proper position, then lock the mechanism by means of the lock-nut 57 and lock-screw 58.

In some cases it may be necessary to have the cutter spindles rotate at a different speed than the driving spindle. This is accomplished by introducing gears between the driving spindle and the driving plate as is shown in Fig. V where one spindle only is shown for the purpose of illustrating the mechanism employed. More cutter spindles may however be employed and arranged around the gear on the driving spindle similar to the one spindle shown in Fig. V and to the cutter spindles formerly described.

In this Fig. V, two driving-cranks engage the driving-plate 65 and the driving-spindle 60, which is journaled in the housing 63, carries the pinion 61 which meshes with the gears 62, each of which is journaled in the housing 63. Two gears 62 being provided here for better balance. Each of these gears 62 has a driving-crank-pin 64 which engages the driving-plate 65. The cutter-spindle 66 has the driven crank-pin 67 which also engages the driving-plate 65. The relations and spacings and operation of the cranks and driving-plate shown here is similar to that described in connection with Figs. I, II, and III.

In order to further increase the efficiency of the apparatus a more substantial structure thereof may be provided wherein the spindles may be journaled on each side of the cranks as illustrated in Fig. VI in which the driving-spindle 68 is journaled in the housing 69 and also in the housing-cover 70 while the cutter-spindle 71 is also journaled in both of these members as shown. The crank-pins 72 and 73 engage the driving-plate 74 in a manner similar to that described in connection with Figs. I, II, and III, the spindles, cranks, and driving-plate also operate in a similar manner.

By omitting driving-gears on cutter-spindles, a more smooth surface is produced by the cutter inserted in the cutter-spindle. It is generally found that a cutter-spindle, which is driven directly by gears, will show teeth marks on the work which feature is objectionable on good work. Furthermore, a cutter-spindle, driven by a crank and plate as shown, provides a more flexible drive than gears; it being similar to an open belt drive. Gears on a cutter-spindle usually produce a jerky and shocky motion to the cutter-spindle which is detrimental to the cutter, particularly to high-speed-steel cutters which are expensive.

The driving-spindles may be spaced regular or irregular, any number of them may be employed within range of the driving-plate and any of them can be placed close together; all of which features are a decided advantage as for instance when drilling a series of holes at one time in which case the holes in the driving-plate and in the housing-cover can be spaced to suit the layout of the holes to be drilled which feature is rather difficult to attain with other apparatus as for instance with gears since they require a certain center-distance for proper mesh which, very rarely, corresponds to the distances between the holes to be drilled. Furthermore, with the present crank arrangement, the cutter-spindles can be located much closer together than with a gear head for instance since the gear body and the teeth require space (it is not good practice to employ gears with less than 12 teeth) whereas, in the present arrangement, the distance between the holes needs to be just sufficient to permit the upper collars on the driving-spindles to clear each other.

The present invention is illustrated as a cutter-spindle-head, but it is understood that this invention can be applied on other spindle-heads as for instance on lathes, grinders, boring-mill drills, multiple spindle machines, etc., wherein one or more spindles are driven by one main spindle and wherein gears are omitted directly on the operating spindles but where gears, such as change speed gears or drive gears may be mounted on the driving-spindle or on sub-driving spindles.

I claim:

1. An apparatus of the character described having a housing, a housing-cover secured to the housing, the housing and housing-cover forming an oil-tight compartment, a crank on the driving-spindle, a plurality of cutter-spindles journaled in the housing-cover, a crank on each cutter-spindle, a driving-plate floatingly mounted within the oil-tight compartment and adapted to engage all of the cranks and to be driven by the crank on the driving-spindle and to drive the cutter-spindles through the cranks thereon.

2. An apparatus of the character described having a housing which forms an oil-tight compartment, a plurality of casings mounted in the housing, a driving-spindle journaled in the housing, a cutter-spindle journaled in each casing, means for adjusting each casing in relation with the housing, a driving-plate floatingly mounted within the oil-tight compartment, a crank on each spindle, and the driving-plate engaging all of the cranks and being driven by the crank on the driving-spindle and driving the cutter-spindles through the cranks thereon.

3. An apparatus of the character described having a housing which forms an oil-tight compartment, a driving-spindle journaled in the housing, a plurality of casings mounted in the housing, each casing adjustable in relation with the housing, a cutter-spindle journaled in each casing, a train of gears within the oil-tight compartment, a driving-plate within the oil-tight compartment, and a crank-engagement between the driving-plate and the gears and the cutter-spindles.

4. An apparatus of the character described having a housing, a driving-spindle, a crank on the driving-spindle, a journal on each side of the crank on the driving-spindle, a plurality of cutter-spindles, a crank on each cutter-spindle, a journal on each side of the cranks on the cutter-spindles, and a driving-plate adapted to engage all of the cranks substantially as set forth.

5. In an apparatus of the character described the combination of a housing, a housing-cover secured to the housing, the housing and the housing-cover forming an oil-tight compartment, a driving-spindle journaled in the housing, a plurality of cutter-spindles journaled in the housing-cover, a driving-plate floatingly mounted within the oil-tight compartment, a crank engagement between the driving plate and the spindles, and an anti-friction thrust-bearing to take the end thrust of each cutter-spindle, and means for adjusting and locking the cutter-spindles longitudinally.

6. In an adjustable spindle the combination of a housing, a casing mounted in the housing, means for adjusting the casing with relation to the housing, a sleeve in the casing, a spindle in the sleeve, there being a driving engagement between the spindle and the sleeve, and means for operating the spindle.

7. A spindle-head having a housing, a housing-cover secured to the housing, a driving-spindle journaled in the housing, a gear on the end of the driving-spindle, a second gear mounted in the housing and adapted to mesh with the first said gear, a crank on the second gear, a driving-plate floatingly mounted in the housing, a cutter spindle journaled in the housing-cover, and a crank on the cutter-spindle; the driving-plate being operated by the crank on the second gear and operating the cutter-spindle through the crank thereon.

8. An apparatus of the character described having a driving-spindle, a driven-spindle, a train of gears driven by the driving-spindle, and a driving-plate which engages the gears and the driven-spindle by crank motions.

GEORGE W. HEINKEL.

Witnesses:
ANDY KNEHR,
MARGARET NOLAN.